United States Patent [19]

Rosenthal et al.

[11] 3,919,280

[45] Nov. 11, 1975

[54] RECOVERY OF SOLVENTS EMPLOYED IN THE PRODUCTION OF ISOCYANATES FROM ESTERS OF CARBAMIC ACIDS

[75] Inventors: Rudolph Rosenthal, Broomall; John G. Zajacek, Strafford; James T. O'Toole, Philadelphia, all of Pa.

[73] Assignee: Atlantic Richfield Company, Los Angeles, Calif.

[22] Filed: July 5, 1974

[21] Appl. No.: 486,034

[52] U.S. Cl. ............................................. 260/453 P
[51] Int. Cl.² ........................................ C07C 118/00
[58] Field of Search .............................. 260/453 P

[56] References Cited
UNITED STATES PATENTS
2,409,712  10/1946  Schweitzer.......................... 260/453

*Primary Examiner*—Lewis Gotts
*Assistant Examiner*—Dolph H. Torrence
*Attorney, Agent, or Firm*—Delbert E. McCaslin

[57] ABSTRACT

In the method for the production of isocyanates from esters of carbamic acids (urethanes) by thermally decomposing said ester while said ester is dissolved in a suitable inert reaction medium solvent to produce the isocyanate and alcohol and removing the isocyanate and alcohol and a carrier agent and separately recovering the isocyanate, alcohol and carrier, the improvement which comprises recovering said reaction medium solvent together with any isocyanate and urethane values contained therein by stripping said solvent and the isocyanate/urethane values from the reactor bottoms away from any heavy by-product residues present in the reactor bottoms effluent. Inert stripping solvents or inert gases or mixtures of gas and solvent are used as the stripping medium and include the solvents, gases or mixtures thereof employed as carrier agents and are preferably the same recovered carrier agents employed during the thermal decomposition reaction.

11 Claims, No Drawings

RECOVERY OF SOLVENTS EMPLOYED IN THE PRODUCTION OF ISOCYANATES FROM ESTERS OF CARBAMIC ACIDS

BACKGROUND OF THE INVENTION

The conversion of esters of carbamic acids to the corresponding isocyanate and alcohol has been extensively investigated. In a co-pending application of Rosenthal et al entitled PRODUCTION OF ISOCYANATES FROM ESTERS OF CARBAMIC ACIDS (URETHANES), Ser. No. 449,291, filed Mar. 8, 1974, there is disclosed a method for the production of isocyanates from esters of carbamic acids (urethanes) by thermally decomposing the ester of the carbamic acid while said ester is dissolved in a suitable inert solvent to produce the isocyanate and alcohol and separately recovering the isocyanate and alcohol. In order that such process be economical it is essential that the inert reaction medium in the thermal decomposition (cracking) step be recovered along with the isocyanate and urethane values contained therein. Although vacuum distillation could be used for this recovery such methods in general are rather expensive and require expensive equipment and handling techniques. The present invention provides an economical method for the recovery of the inert solvent together with the isocyanate and urethane values contained therein.

SUMMARY OF THE INVENTION

In accordance with the instant invention the inert reaction medium solvent utilized in the cracking step of the process of the aforementioned application to Rosenthal et al is recovered together with the isocyanate and urethane values contained therein by a stripping operation.

In the process of the aforementioned application an inert carrier is employed to remove the alcohol and the isocyanate from the reactor and the isocyanate, alcohol and carrier agent are recovered separately by condensation methods leaving as bottoms in the reactor inert reaction medium solvent containing isocyanate and urethane values dissolved therein and a by-products fraction generally of high molecular weight. The isocyanate taken overhead is condensed to separate it from the carrier agent and alcohol, and thereafter the alcohol and carrier agent are condensed (unless the carrier agent is an inert gas such as nitrogen). The carrier agent in accordance with the preferred method of this invention is re-vaporized if necessary and used to strip the inert solvent together with any isocyanate and urethane values contained therein away from the heavy by-product residues present in the reactor bottom. This provides a convenient and economical method of recovering essentially all of the inert solvent as well as from 85 to 100 per cent of the isocyanate and urethane values present in the solvent. The inert gaseous carrier agent may be recycled and used to strip the inert solvent. Stripping solvents or gases other than those used as carrier agents during the decomposition reaction may be employed. In such case, the carrier agents may be merely recycled for reuse to the thermal decomposition reaction or recovered.

It is an object of this invention therefore to provide a method for the recovery of the inert reaction medium solvent together with isocyanate and urethane values contained therein which solvent has been utilized in the thermal decomposition of esters of carbamic acids (urethanes) to produce the isocyanate and alcohol.

It is another object of this invention to utilize the inert solvent or gaseous carrier agent employed in the removal of isocyanate and alcohol from the inert reaction medium solvent employed in the cracking or urethanes to isocypanates and alcohol as a stripping agent to recover the inert reaction medium solvent and any isocyanate/urethane values contained therein.

Other objects of this invention will be apparent from the following description and from the claims.

DESCRIPTION OF THE INVENTION

In order to carry out the process of this invention an isocyanate is produced from an ester of a carbamic acid. Representative carbamate starting materials may be characterized by the formulas $R(NHCOOR')_x$ or $(RNHCOO)_xR'$ wherein R is a substituted or unsubstituted mono-, di- or trivalent organic radical and the corresponding isocyanate of such radical does not boil above about 375°C. The R is selected from saturated or monoolefinic unsaturated straight or branched chain aliphatic or cycloaliphatic radicals, alkoxyalkyl radicals with one or more ether linkages, aryl radicals, aralkyl radicals, and alkaryl radicals but the limiting proviso is that the isocyanates of such radicals do not boil above 375°C.

R' is a substituted or unsubstituted mono-, di- or trivalent organic radical and the corresponding hydroxy compound or alcohol does not boil above about 325°C. The R' is preferably mono- or divalent, selected from saturated or monoolefinic unsaturated, straight or branched chain aliphatic radicals, alkoxyalkyl radicals, aryl radicals, aralkyl radicals and alkaryl radicals again with the proviso that the corresponding hydroxy compound or alcohol does not boil above about 325°C.; and $x$ is 1, 2 or 3, each R or R' being the same of different, respectively, when $x$ is 2 or 3.

Preferably R will be an organic aliphatic radical, for example, methyl, ethyl, propyl, isopropyl, butyl, isobutyl, amyl, isoamyl, neopentyl, the hexyls, and the like and the monoolefinic compounds such as propenyl, butenyl, pentenyl, hexenyl, and the like. The divalent radicals such as ethylene, propylene, butylene, amylene, hexylene, and the like also are included and likewise the trivalent radicals. These radicals may be hydrocarbyl or may be substituted with groups non-reactive with isocyanates, for example, nitro or halo, in particular chloro groups. Also included are the cycloaliphatic radicals containing from 5 to 7 carbon atoms preferably such as the cyclopentyl, cyclohexyl and cycloheptyl radicals, likewise the di- trivalent corresponding radicals. The mono-unsaturated $C_5$ to $C_7$ cycloaliphatic radicals are also included as well as the substituted compounds wherein the substituent is a lower alkyl radical of 1 to 4 carbon atoms, or nitro, or halo such as chloro. The alkoxyalkyl radicals are preferably short chain such as methoxymethyl and ethoxyethyl.

Likewise R can be an aryl radical such as the mono-, di- and trivalent radicals of benzene, toluene, naphthalene, diphenyl, and the like with the mono- and divalent radicals being particularly preferred. These aryl radicals can also be substituted with one or more lower alkyl groups preferably having from 1 to 4 carbon atoms or by radicals non-reactive with isocyanates such as nitro or halo, particularly chloro radicals. In addition to the alkaryl radicals, the aralkyl radicals, such as methyl, ethyl, propyl, and butyl radicals having a hydrogen substituted by phenyl, naphthyl, or similar radicals thus the lowest member of the group is methyl having a phenyl radical substituted for a hydrogen on the methyl giving a benzyl radical. Likewise more than one hydrogen may be substituted with a phenyl group as in diphenyl methane, the corresponding aralkyl radical being diphenylmethyl.

Preferably the R' of the above formula will be an organic radical similar to those enumerated for R with the proviso that the alcohol of such radical or hydroxy compound corresponding to such radical have a boiling point below about 325°C.

Representative esters of carbamic acids as characterized above include ethyl phenylcarbamate (alternatively named ethyl N-phenylcarbamate or also the ethyl ester of carbanilic acid, or preferably ethyl carbanilate), butyl carbanilate, ethyl 1-naphthalenecarbamate, ethyl para-phenylcarbanilate, ethyl bis(para-phenylcarbanilate), diethyl metabenzenedicarbamate, methyl isopropylcarbamate, ethyl (methoxymethyl) carbamate, methyl sec-butylcarbamate, ethyl (3-chloropropyl)carbamate, methyl tertiary butylcarbamate, ethyl 1-ethylcyclohexanecarbamate, methyl paratoluenecarbamate, isopropyl metal-chlorocarbanilate, dimethyl toluene-2,4-dicarbamate, diethyl toluene-2,4-dicarbamate, dipropyl toluene-2,4-dicarbamate, diisopropyl toluene-2,4-dicarbamate, dibutyl toluene-2,4-dicarbamate, diamyl toluene-2,4-dicarbamate, dihexyl toluene-2,4-dicarbamate, diphenyl toluene-2,4-dicarbamate, the corresponding esters of toluene-2,6-dicarbamate, diethyl 4-chloro-meta-benzenedicarbamate, methyl para-butoxy carbanilate, ethyl para-acetylcarbanilate, ethyl parabromocarbanilate, ethyl ortho-nitrocarbanilate, ethylene bis(toluene-2,4-dicarbamate) and the like. These esters specifically named are obviously merely representative of the very large number of esters falling within the definition of the general formulua for the compounds which can be converted to isocyanates by the method of this invention. In general, the methyl and ethyl esters are more readily available and therefore these are more preferred.

One of the above described esters are added to an inert solvent, to be characterized completely hereinafter in an amount such that substantially all of the ester will be completely dissolved at the reaction temperature and in addition be higher boiling than the isocyanate products. The ester can either be added to the cold solvent and the mixture heated to reaction temperature, which method is generally employed in smaller scale batch runs, or the ester can be added to the heated solvent continuously as would be more feasible for commercial large scale operations.

The thermal decomposition process can be carried out at temperatures ranging from 175°C. to 350°C. with a more preferred range being from 200°C. to 300°C.

The reaction time can vary from several minutes to several hours depending upon the particular ester of the carbamic acid being reacted and the reaction temperature employed. In general times ranging from 5 minutes to 4–6 hours are sufficient to obtain the desired cracking of the esters in batch runs, while in continuous runs, residence times of from 3 to 20 hours are preferred.

The cracking process is preferably carried out at or near atmospheric pressure when suitable inert high boiling solvents are employed, or it can be run at superatmospheric pressures when lower boiling solvents are used. Subatmospheric pressures can also be used with high boiling solvents but these subatmospheric pressures are not required.

It is important in carrying out the cracking process that the ester of the carbamic acid be substantially completely dissolved in the reaction medium solvent at reaction temperature during conversion to the isocyanate and alcohol. If the alcohol is lower boiling than the isocyanate as is usually the case then the alcohol can be removed by the assistance of the inert gaseous carrying agent being passed through the solution such as through a fritted disc or similar means for dispersion or by the use of a lower boiling carrier solvent meeting the same criteria as will be set forth hereinafter and boiling below the isocyanate produced and above or below the alcohol, thus the highest boiling carrier solvent would be about 350°C. since the maximum boiling range isocyanate is 375°C. The maximum boiling range alcohol is 325°C. By this means recombination of the alcohol and isocyanate is minimized. Moreover, since the reaction is carried out in solution the formation of polymerizatin products such as tars and resins is inhibited as is the formation of undesirable by-products such as amines and carbon dioxide formerly associated with the thermal decomposition of esters of carbamic acids. Mixtures of the inert carrier gas and inert carrier solvent may be used, for example, nitrogen and tetrahydrofuran.

In the method which is preferred for continuous operation both the alcohol and isocyanate after formation in the solution are removed into the vapor phase either by the use of an inert carrier gas or a suitable carrier solvent or mixtures thereof. The isocyanate and alcohol are then separated from the gas by suitable condensation, or when a solvent or a mixture of gas and solvent is employed to carry the products overhead, the isocyanate and then solvent and alcohol are separated by suitable methods of condensation with the gas being recycled for reuse.

The inert carrier gases which can be employed include nitrogen, helium, argon, carbon dioxide, methane, ethane, propane, and the like either alone or in mixtures.

The solvents which can be used alone or in mixtures in the process of this invention both in the reaction medium and for carrying the products overhead are compounds which meet certain criteria. The reaction medium solvent must be capable of dissolving the particular ester of the carbamic acid at reaction temperature to an extent sufficient to make the process practical and be higher boiling than the isocyanate product. Thus if the ester were soluble in the reaction medium solvent to the extent of 1 weight per cent or less the process would be operable, but not particularly attractive for a commercial standpoint. Consequently, although the lower ester concentration limit might be considered to be about 1 weight per cent, it is preferred that the ester be soluble at least to from 3 to 5 weight per cent at reaction temperature.

Since it is necessary in accordance with the objects of this invention to carry out the conversion of the ester of the carbamic acid in solution it is preferred that the concentration of the ester in the reaction medium solvent should not exceed from 70–80 weight per cent based on the weight of the solution.

Both the reaction medium solvent and the solvent employed to carry the reaction products overhead (the carrier solvent) and the stripping solvent which may be the same as the carrier solvent must not decompose at the reaction temperature employed and in addition these solvents cannot contain active hydrogens which, of course, would react with the isocyanate produced. In general any compound containing reactive groups that combine with the isocyanate should not be employed as these solvents in this invention.

Therefore, the parameters for suitable solvents in this invention are (a) compounds that are solvents for the starting carbamate (b) compounds that are stable at the reaction temperature (c) compounds that are non-reactive with the generated isocyanate and (d) compounds or mixture of compounds that meet the boiling points required to effectively carry out the process of the invention.

In view of these criteria or parameters, the compounds which can be used as reaction medium solvents, carrier solvents or stripping solvents in this invention include aliphatic, cycloaliphatic or aromatic hydrocarbons or substituted hydrocarbons or mixtures thereof, and also certain oxygenated compounds such as ethers, ketones and esters. Other oxygenated compounds such as alcohols and acids cannot be used because of their reactivity with the generated isocyanate. Water also must, of course, be excluded. The sulfur analogues of the ethers, ketones, and esters also can be employed. When operating at atmospheric pressure the boiling point of the solvent or solvent mixture sould be at or above the desired operating temperature up to a maximum of about 400°C. Lower boiling solvents or mixtures of solvents can be used by employing superatmospheric pressures, however, since the reaction must be carried out in the liquid phase, the solvent or mixture of solvents cannot have a critical temperature below 175°C. (the minimum reaction temperature).

In general, the compounds preferred are the aromatic hydrocarbons having from 1 to 3 rings including the alkyl benzenes having from 1 to 15 carbon atoms in the alkyl group, the halo (particularly chloro) substituted and the mono-nitro substituted aromatics; the aliphatic hydrocarbons having at least 4 carbon atoms, the substituted aliphatics such as the halo (particularly chloro and fluoro) and mono-nitro substituted aliphatics having at least 4 carbon atoms, the nitro substituted aliphatics having at least 4 carbon atoms, the cycloaliphatic hydrocarbons and lower alkyl substituted cycloaliphatic hydrocarbons, the oxygenated compounds selected from the group consisting of ethers, ketones and esters having at least 4 carbon atoms and sulfur analogues of these compounds. The upper limit of these compounds is set by the requirement that their boiling point should not exceed about 400°C.

Suitable compounds which can be utilized as the reaction medium solvent include, for example, the higher molecular weight alkanes or monoalkenes which can be either straight or branched chain such as n-hexadecane, n-octadecane, eicosane, squalane and the like and the corresponding monoalkenes. Lower molecular weight compounds such as the $C_4$'s although having a critical temperature below 175°C. can be employed in conjunction with the compounds having critical temperatures above 175°C. provided that the mixture has a critical temperature above 175°C. Aromatics such as alkyl aryl hydrocarbons for example, a monoalkylated benzene wherein the alkyl group can be either branched or straight chain and contains from 10 to 15 carbon atoms or mixtures of such alkyl benzenes can be used, particularly the alkyl benzene fraction with over 90 weight per cent of the mixture having from 10 to 13 carbon atoms with an average side chain of 11 carbon atoms attached to the benzene ring. Alkyl and halogen substituted naphthalenes, e.g. chloronaphthalenes and the like, diphenyl and substituted diphenyls, diphenyl methane, terphenyls, such as ortho-terphenyl, substituted terphenyls, anthracenes, phenanthrenes and the like can be employed with equal utility and recovered by the method of the present invention.

High boiling ethers, cyclic ethers and polyether solvents which do not contain a substitutent group which would react with an isocyanate can be used likewise other oxygen containing compounds such as high boiling ketones and esters, for example dibutyl phthalate, dihexyl phthalate, dioctyl phthalate, didecyl phthalate and the like are suitable as are the sulfur analogues of these compounds.

The inert carrier solvents employed to carry the reaction product or products overhead and the stripping solvents used to recover the reaction medium solvent are those which have a boiling point below the product isocyanate and do not decompose at the reaction temperature employed and in addition, these solvents cannot contain active hydrogens which, of course, would react with the isocyanate produced. In general any compound containing reactive groups that combine with the isocyanate should not be employed as carrier or stripping solvents in this invention. Mixtures of solvents may be used as the carrier agent or stripping agent.

The compounds which can be used as inert carrier or stripping solvents in this invention are generally the lower boiling solvents, that is, solvents having a boiling point below the isocyanate produced which, for example, with respect to toluene-2,4-diisocyanate (TDI) would be 251°C. and include aliphatic, cycloaliphatic or aromatic hydrocarbons or substituted hydrocarbons or mixtures thereof, and also certain oxygenated compounds such as ethers and ketones. Alcohols and acids cannot be used because of their reactivity with the generated isocyanate and, of course, water must be excluded. The sulfur analogues of the ethers and ketones can be employed.

Thus, more specifically suitable compounds for use as the inert carrier or stripping solvent include alkanes such as pentanes, hexanes, heptanes, octanes, nonanes, and decanes. Lower molecular weight compounds such as the $C_4$'s can be used as carrier or stripping solvents. The aromatics such as benzene, toluene, ortho-xylene, meta-xylene, para-xylene mixtures of two or more of the xylenes, ethylbenzene, cumene, trimethylbenzenes, diisopropylbenzenes, dibutylbenzenes, naphthalene, substituted benzenes non-reactive with isocyanates such as the nitro or halogenated compounds for example, the chlorobenzenes, nitrobenzenes and the like may be used. Likewise cycloaliphatic hydrocarbons such as cyclopentane, methylcyclopentane, 1,1-dimethyl cyclopentane, ethyl cyclopentane, cyclohexane, methyl cyclohexane, ethyl cyclohexane, cycloheptane and others of 5 to 8 carbon atoms may be used as the carrier agent or stripping solvent.

Ethers (including cyclic ethers), polyethers and ketones which do not contain a substituent group which would react with an isocyanate can also be used, for example, tetrahydrofuran, dioxane and methyl ethyl ketone.

In summary compounds meeting the criteria which have been set forth can be employed as the reaction medium solvent or carrier solvent or stripping solvent since in order to meet the objectives of the invention, the conversion of the ester of the carbamic acid to give the isocyanate and alcohol must take place in solution from which the isocyanate and alcohol can be recovered without reaction of the isocyanate with the solvent.

It is to be understood that the solvents for use as reaction medium, carrier and stripping solvents may be interchanged provided they fall within the parameters specified for the decomposition reaction, recovery of product and recovery of reaction medium solvent employed to carry out the method the instant invention.

In order, however, to recover the reaction medium solvent it is necessary that it be the highest boiling material. The isocyanate being produced will generally boil between the boiling point of the reaction medium solvent and the carrier solvent. The alcohol produced generally will have the lowest boiling point but may have a boiling point above the carrier solvent. The difference between the boiling points of the isocyanate, alcohol and carrier solvent, should be preferably at least 10°C. in order to facilitate separation.

In batch reactions the urethane is dissolved in the reaction medium solvent generally referred to as the "heavy" solvent since it is the higher boiling solvent. The cracking reaction is carried out at the desired temperature between 175°C. and 350°C. as stated with the carrier solvent or inert gas or mixtures of gas and solvent being introduced to remove the cracked products, i.e., the isocyanate and alcohol overhead.

Since the isocyanate will generally have a higher boiling point than the carrier solvent it is removed first by condensation, and then the carrier solvent and alcohol are condensed and separated from each other in order depending on the relative boiling points of each.

If an inert gas is employed as the carrier agent, the isocyanate is condensed and then the alcohol thus leaving the inert gas free of products.

If a mixture of inert gas and solvent are employed the order of condensation of isocyanate, alcohol and carrier agent is the same with the gas being recycled for further use as carrier agent or recovered for possible use as stripping agent or both.

In the recovery method of this invention in the batch process the condensed carrier solvent is revaporized and when the cracking reaction is essentially completed, in the time hereinbefore set forth, it may be used to remove the heavy solvent from the reaction pot by stripping it away from the heavy bottoms residue. At the same time any isocyanate and urethane values contained in the heavy solvent will also be stripping and taken overhead.

The heavy solvent and urethane/isocyanate values are condensed first and finally and the stripping solvent. Frequently in the stripping operation additional cracking of urethane values to isocyanate occurs since the temperature required to strip the heavy solvent from the heavy by-product residues also is sufficiently high to cause urethane cracking. Thus there may be some alcohol left to be condensed.

If an inert gas has been used as the stripping agent, it of course, is not condensed but is used merely to strip overhead and heavy solvent, isocyanate and urethane values. Again cracking can occur so the order of condensation is the same, i.e., heavy solvent, urethane, isocyanate and the alcohol.

The stripping process can be carried out at temperatures similar to those utilized during the decomposition reaction, e.g., 175°C. to 350°C. with a more preferred range being from 200°C. to 310°C.

In continuous operation a great many variations are possible. For example, two or more reactors could be arranged in series or two or more reactors in series followed by vaporization of the heavy solvent or of the carrier solvent and heavy solvent. These vapors may be passed through each of several reactors serially or they may be apportioned among the vessels in a variety of ways. A part of the vapor may be condensed or absorbed at each stage or optionally additional vapor can be produced by heating. The vapor released from each vessel may pass wholly or in part to one or more of the other reactors or it may be discharged for recovery of products. The various vessels may operate at the same or different temperatures and may contain identical or varying amounts of each chemical species.

In all cases, however, the same principle applies, namely, passing a vapor stream in whole or in part successively from one vessel to another at a lower pressure to provide forward flow. In this way economy of operation is obtained by avoiding the need either to recompress the vapor or to totally condense and revaporize the heavy solvent. Vaproization of the reaction products is also affected more economically than would be the case if only fresh vapor were injected into each vessel.

For example, in a two reactor system a mixture of diethyl toluene-2,4-dicarbamate and xylene (a commmercial mixture of the isomer) is charged to the first reactor which contains for example an alkylated benzene as the heavy solvent. The alkylated benzene can be a mixture of compounds wherein the alkyl group contains from 10 to 13 carbon atoms with an average of 11. Another preferred alkyl benzene fraction has from 10 to 15 carbon atoms in the alkyl side chain, with over 90 weight per cent of the mixture having from 12 to 14 carbon atoms with an average of 13 carbon atoms attached to the benzene ring.

The overhead stream from the first reactor consists of xylene, toluene diisocyanate and ethyl alcohol as the principal components and depending upon the boiling point of the heavy solvent, some heavy solvent may also be taken overhead. In the instant case some of the alkyl benzene heavy solvent will be taken overhead. This is sent to a condensation tower which separates a first stream containing a portion of the alkyl benzene and xylenes which are returned to the first reactor; a second stream containing the toluene diisocyanate together with a small amount of alkylbenzene and xylenes which stream is successively fractionated to first remove the xylenes as an overhead, with the alkylbenzene and toluene diisocyanate as bottoms, which bottoms are then fractionated to give the pure toluene diisocyanate product and an alkyl benzene bottoms which is recycled to the first reactor, and a third overhead stream containing the ethyl alcohol together with a small amount of xylenes which are condensed and separated from the alcohol. The xylene streams are combined and a portion is vaporized for use in the alkyl benzene recovery and purification as will be described.

A portion of the heavy solvent, i.e., the alkyl benzenes, the uncracked dicarbamate and some xylenes are taken from the bottom of the first reactor (together with any heavy by-product impurities) and charged to a second reactor for further cracking of the dicarbamate.

A portion of this bottom stream from the first reactor can be recycled, however, to the reactor.

In the second reactor additional cracking occurs and an overhead containing the cracked products (toluene diisocyanate and ethyl alcohol) together with some xylenes and a small amount of the alkylbenzene is returned to the first reactor.

A bottoms stream from the second reactor containing the heavy by-product impurities, the alkyl benzene heavy solvent, uncracked dicarbamate and some toluene diisocyanate is then sent to the heavy solvent recovery tower, although if desired a portion of this bottoms stream can be recycled to the second reactor.

In the solvent recovery tower this bottoms stream from the second reactor is contacted with the above described vaporized xylene stream which strips the heavy solvent, i.e., alkyl benzene in this case, uncracked dicarbamate (urethane) and toluene diisocyanate away from the heavy by-products which are removed from the bottom of the stripping tower, i.e., the heavy solvent recovery and purification tower, while the remaining stripped components and xylenes are taken overhead and returned to the second reactor.

This is but one of many means of utilizing the process of the instant invention to recover the heavy solvent together with the isocyanate and urethane values in an economical and efficient manner.

The following examples are provided to illustrate the recovery of heavy solvent in accordance with the principles of this invention but these examples should not be construed as limiting.

EXAMPLE I

A number of continuous cracking runs were made using an alkyl benzene mixture as the heavy solvent. This mixture consisted of monoalkylated benzenes wherein the alkyl group was straight chain and contained from 10 to 13 carbon atoms with an average of 11 carbons. It is sold under the tradename "Dodane-S." The light inert carrier solvent was tetrahydrofuran used in conjunction with nitrogen gas and the urethane being cracked with diethyl toluene-2,4-dicarbamate.

The material used in the solvent recovery runs was the combined reactor bottoms of these continuous runs from which most of the tetrahydrofuran had been removed by distillation, the product then contained 74.9 weight per cent Dodane-S, 0.52 weight per cent toluene-2,4-diisocyanate, 2.60 weight per cent toluene monoisocyanatemonocarbamate, 1.38 weight per cent dicarbamate with the remainder being tetrahydrofuran and unidentified by-products.

A 50 gram portion of this bottoms composite was diluted with 150 grams of mixed xylenes. A 50 gram portion of the diluted mixture was placed in a 3 necked round bottom flask provided with a dropping funnel thermometer, and connected with an overhead receiver. The mixture in the flask was heated to 275°C. and then the remaining 150 grams of mixture was added dropwise over a 2 hour period holding the temperature at 275°C. The results are shown in Table I.

TABLE I

| Charged | Recovered | | | |
|---|---|---|---|---|
| | Overhead | Bottoms | Xylene wash of residue | Total |
| $TDI^1$ = 0.0015 mol | 0.0077 mol | 0.0004 mol | 0.0002 mol | 0.0083 mol |
| $mono^2$ = 0.0059 mol | 0.0016 mol | 0.0004 mol | 0.0001 mol | 0.0020 mol |
| $di^3$ = 0.0026 mol | 0.0001 mol | 0.0001 mol | — | 0.0001 mol |
| Total = 0.0100 mol | 0.0093 mol | 0.0009 mol | 0.0002 mol | 0.0104 mol |
| Dodane = 37.5g | 28.9g | 10.0g | 0.8g | 39.7g |

$^1$TDI - is toluene-2,4-diisocyanate
$^2$mono refers to the monoisocyanate-monocarbamate
$^3$di refers to the dicarbamate starting material.

It was found that about 77 per cent of the Dodane-S and 93 per cent of the isocyanate/urethane products were carried overhead. The discrepancy in the amount of Dodane-S between that charged and that obtained was traced to the analytical method employed, i.e., the gas-liquid phase chromatographic method.

EXAMPLE II

Another run was carried out in the same manner as for Example I, except that the stripping temperature was raised to 290°C. and fluctuated up to 310°C. and the results are shown in Table II.

TABLE II

| Charged | Recovered | | | |
|---|---|---|---|---|
| | Overhead | Bottoms | Xylene wash of residue | Total |
| $TDI^1$ = 0.0015 mol | 0.0039 mol | — | trace | 0.0039 mol |
| $mono^2$ = 0.0059 mol | 0.0036 mol | — | 0.0001 mol | 0.0037 mol |
| $di^3$ = 0.0026 mol | 0.0009 mol | — | trace | 0.0009 mol |
| Total = 0.0100 mol | 0.0084 mol | — | 0.0001 mol | 0.0085 mol |
| Dodane = 37.5g | 37.9g | — | 0.3g | 38.2g |

$^1$TDI - is toluene-2,4-diisocyanate
$^2$mono refers to the monoisocyanate-monocarbamate
$^3$di refers to the dicarbamate starting material.

In this run all of the solvent was carried overhead and about 85 per cent isocyanate/urethane products were accounted for. In both examples it will be seen that considerable cracking of the mono and diurethane occurs under these conditions. Irrespective of the inherent inaccuracy in the analysis for Dodane-S it is clear that at the higher temperatures substantially complete recovery of the solvent is accomplished.

EXAMPLE III

To 50 g. of reactor bottoms effluent obtained in continuous thermal decomposition runs of diethyl toluene- 2,4-dicarbamate in n-hexadecane (b.p. 287°–288°C.) solvent with tetrahydrofuran and nitrogen gas as carrier was added 150 g. mixed xylenes. A portion of this mixture, 195 g., containing 43.3 g. n-hexadecane, 0.0036 mol toluene-2,4-diisocyanate, 0.0056 mol monocarbamate-monoisocyanate, and 0.0016 mol diethyl toluene-2,4-dicarbamate, the balance being xylenes, tetrahydrofuran, and by-products of the decomposition run, was treated as in Example I with the reactor temperature at 235°–285°C. until most of the material had distilled from the pot. Analysis of the overhead showed the presence of 39.1 g. n-hexadecane, 0.0071 mol -2,4-diisocyanate, 0.0031 mol monocarbamate-monoisocyanate, and 0.0002 mol diethyl toluene-2,4-dicarbamate. The residue contained 1.8 g. n-hexadecane and less than 0.0001 mol of mono- and diisocyanates. This represents a recovery of 94.4 weight per cent of the n-hexadecane and 96.3 mol per cent of the urethane/isocyanate values.

EXAMPLE IV

To 50 g. of reactor bottoms effluent obtained by continuous thermal decomposition of diethyl toluene-2,4-dicarbamate using an alkyl benzene mixture as reaction medium solvent (Dodane-S) b.p. 280°–306°C.) with mixed xylenes as carrier solvent is added 150 g. of recovered mixed xylenes which are obtained by condensation of the xylenes used during the cracking of the diethyl toluene-2,4-dicarbamate to toluene diisocyanate and ethyl alcohol. The bottoms product contains 75 weight per cent Dodane-S, 0.54 weight per cent toluene-2,4-diisocyanate, 2.65 weight per cent toluene monoisocyanate-monocarbamate, 1.33 weight per cent dicarbamate with the remainder being xylenes and by-product bottoms of the decomposition run and is treated as in Example I with the reactor temperature at 285°–305°C. until most of the material is distilled from the pot. Analysis of the overhead shows that 96 per cent of the alkyl benzene is carried overhead and about 89 per cent of the isocyanate/urethane products accounted for.

EXAMPLE V

A 100 g. sample of reactor effluent and pot bottoms from continuous urethane pyrolysis runs using $N_2$ and tetrahydrofuran as carrier agents and n-hexadecane as the reaction medium solvent, containing 0.0002 mole TDI, 0.0023 mole monourethane-monolsocyanate, 0.0037 mole diethyl toluene-2,4-dicarbamate and 19.9 g. n-hexadecane, the balance being tetetrahydrofuran and "heavy" pyrolysis byproducts, was dropped into a round bottom flask over a 40 minute period keeping the pot temperature at 270°C.±10°C. Nitrogen was passed into the flask at the rate of about 25 liters per hour. The product carried overhead was analyzed for n-hexadecane and urethane/isocyanate values and was found to contain 19.3 g. n-hexadecane, 0.0032 mole TDI, 0.0020 mole monourethane-monoisocyanate, and 0.0004 mole diethyl toluene-2,4-dicarbamate. This represents a recovery of 97.1 mole per cent of the n-hexadecane and 90.3 mole per cent of the urethane/isocyanate values in the original reaction product bottoms. This run also demonstrates that additional pyrolysis of the urethanes occurs during the solvent recovery step and demonstrates re-use of the same mixed nitrogen carrier gas and tetrahydrofuran carrier solvent employed in the pyrolysis reaction.

The parameters for the solvents suitable for the method of this invention have been described, however, the preferred reaction medium solvents or heavy solvents are hexadecane, octadecane, and the Dodane-S, i.e., the alkyl benzenes having an average of about 11 carbon atoms in the straight chain alkyl group and range from 10–13 carbon atoms. Another solvent suitable is an alkyl benzene fraction having from 10 to 15 carbon atoms in the alkyl side chain, with over 90 weight per cent of the mixture having from 12 to 14 carbon atoms with an average side chain length of 13 carbon atoms attached to the benzene ring. The carrier solvents and stripping solvents are preferably the aromatics such as toluene, a single xylene isomer or a mixture of the xylene isomers and the trimethylbenzenes. However, as has been pointed out inert gaseous carrier agents alone or in mixture with an inert solvent are also useful in the method of this invention.

We claim:

1. In a method for the production of isocyanates from esters of carbamic acids by thermally decomposing said ester while said ester is dissolved in an inert reaction medium solvent to produce the isocyanate and corresponding alcohol, removing the isocyanate and alcohol as overhead in the vapor phase with a carrier agent and separately recovering the isocyanate and alcohol and carrier agent, leaving inert reaction medium solvent containing isocyanate and urethane values dissolved therein and by-product residue as bottoms, the improvement which comprises recovering said inert reaction medium solvent said solvent being a higher molecular weight compound or mixture of compounds selected from the group consisting of aliphatic, cycloaliphatic or aromatic hydrocarbons, substituted hydrocarbons, oxygenated compounds selected from the group consisting of ethers, ketones and esters and the sulfur analogues of said oxygenated compounds, together with isocyanate and urethane values contained therein by stripping said inert solvent and the isocyanate/ urethane values from the thermal reactor bottoms and the byproduct residue present in said reactor bottoms at temperatures in the range of 175°C. to 350°C. with an inert stripping agent selected from inert solvents, which are lower boiling inert compounds or mixture of compounds selected from the group consisting of aliphatic or aromatic hydrocarbons, substituted aromatic hydrocarbons, cycloaliphatic hydrocarbons, oxygenated compounds selected from the group consisting of ethers and ketones and the sulfur analogues of said oxygenated compounds, inert gases selected from the group consisting of nitrogen, helium, argon carbon dioxide, methane, ethane and propane and mixtures of solvents and gases.

2. A method according to claim 1 wherein said stripping agent is said recovered carrier agent utilized in the thermal decomposition of said esters of carbamic acids.

3. A method according to claim 2 wherein said stripping agent is an inert gas, an inert solvent or mixtures thereof.

4. A method according to claim 3 wherein said inert solvent is a xylene.

5. A method according to claim 3 wherein said inert gas is nitrogen.

6. A method according to claim 1 wherein the stripping agent is a xylene or tetrahydrofuran.

7. A method according to claim 1 wherein the stripping agent is a mixture of nitrogen and tetrahydrofuran.

8. A method according to claim 1 wherein the reaction medium solvent is an alkane or monoalkylated aryl hydrocarbon.

9. A method according to claim 8 wherein the reaction medium solvent is selected from the group consisting of hexadecane, heptadecane, octadecane and monoalkylated benzene having from 10 to 15 carbon atoms in the alkyl group.

10. A method according to claim 1 wherein the stripping operation is carried out at a temperature in the range of 200°C. to 310°C.

11. A method according to claim 1 wherein urethane values contained in the reaction medium bottoms are cracked to isocyanate and alcohol during the stripping operation and recovered with said inert stripping agent.

* * * * *